(No Model.) 2 Sheets—Sheet 1.
C. HUTCHINSON.
NAUTICAL PARALLEL RULER.
No. 298,471. Patented May 13, 1884.
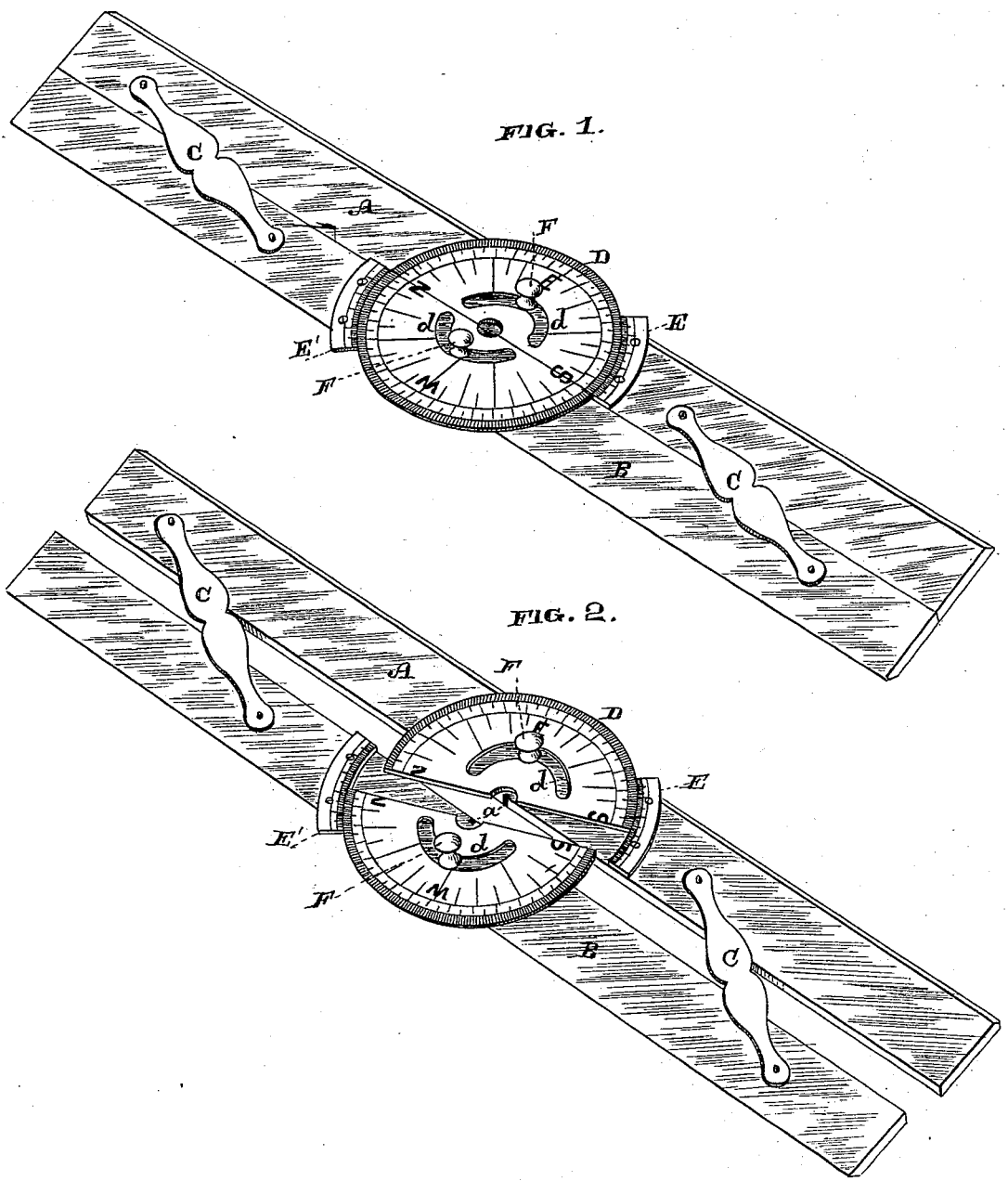

(No Model.) 2 Sheets—Sheet 2.
C. HUTCHINSON.
NAUTICAL PARALLEL RULER.
No. 298,471. Patented May 13, 1884.
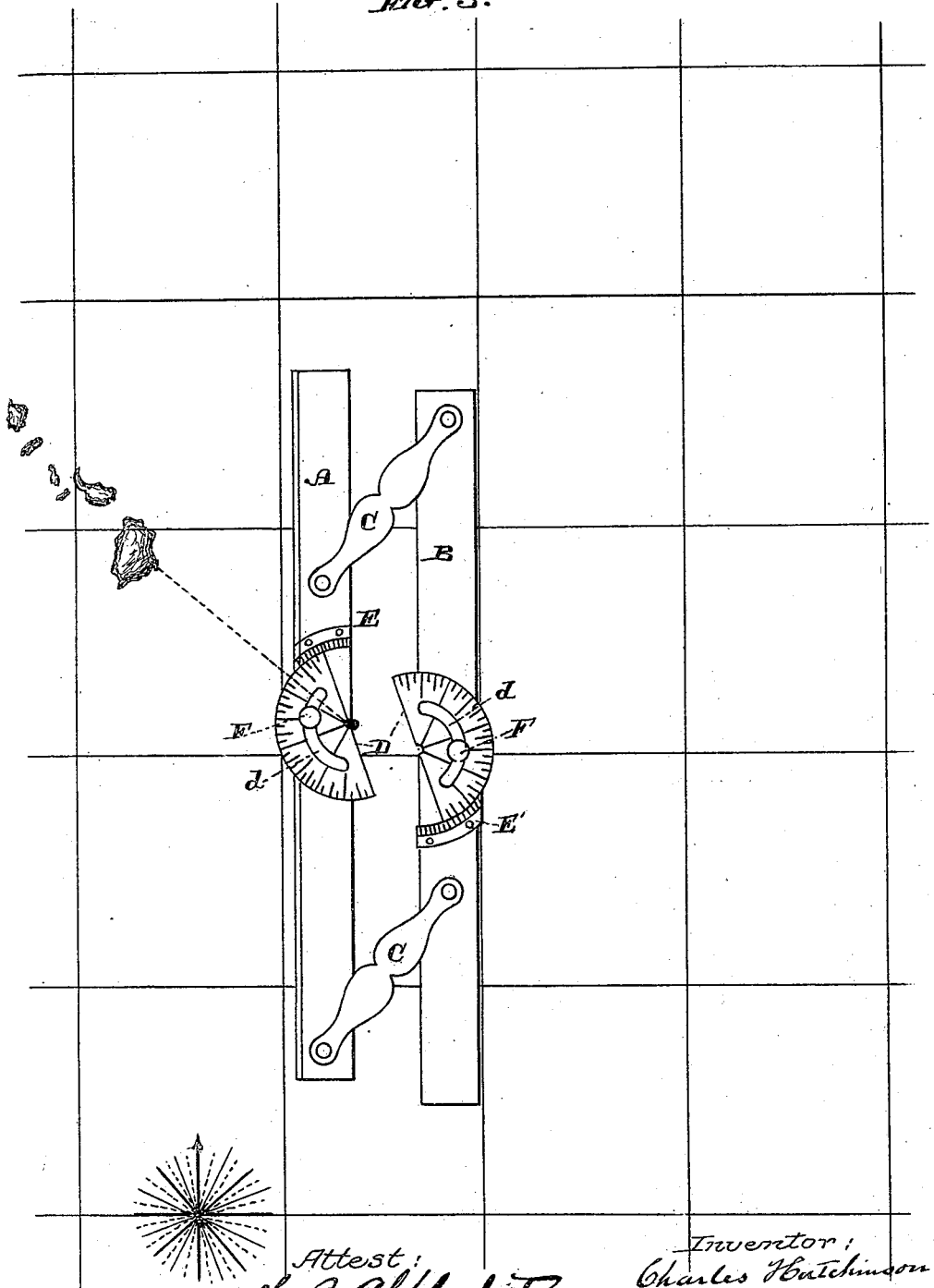

UNITED STATES PATENT OFFICE.

CHARLES HUTCHINSON, OF SAN FRANCISCO, CALIFORNIA, ASSIGNOR OF ONE-HALF TO WILLIAM BENDT, OF SAME PLACE.

NAUTICAL PARALLEL RULER.

SPECIFICATION forming part of Letters Patent No. 298,471, dated May 13, 1884.

Application filed January 21, 1884. (No model.)

*To all whom it may concern:*

Be it known that I, CHARLES HUTCHINSON, of the city and county of San Francisco and State of California, have invented an Improvement in Nautical Parallel Rulers; and I hereby declare the following to be a full, clear, and exact description thereof.

My invention relates to the class of nautical instruments, and more particularly to a new and useful instrument for use in shaping courses and taking cross-bearings.

My invention consists of parallel rulers upon which is pivoted a plate marked with the points of the compass, and adapted to turn thereon, and an arc or arcs adapted to indicate the angle or degree of variation to which the compass is turned, as I shall hereinafter fully describe.

The object of my invention is to provide an instrument adapted for use in shaping courses and taking cross-bearings, in the use of which there will be no liability to mistake, and which can be handled easily and rapidly.

Referring to the accompanying drawings, Figure 1 is a perspective view of my instrument, showing the rulers closed and the compass-plate fixed due north and south therewith. Fig. 2 is a perspective view, showing the rulers separated and the compass-plate turned to indicate a variation. Fig. 3 is a view showing the ruler as used for shaping courses.

A is one ruler, and B another, the two being united in the usual manner by pivoted links C. Upon the centers of these is a compass-plate, D, properly laid off into points and degrees. Upon the ruler A is an arc, E, laid off with points and degrees. One end or line of this arc is flush with the inner edge of the ruler, and the compass itself for the length of the arc is concentric therewith, its periphery fitting close against the inner rim of the arc. Upon the ruler B is a similar arc, E', occupying a corresponding position to the opposite side or circumference of the compass, and having one end flush with the inner edge of the ruler to which it is attached. The compass itself is made in halves, each part having a curved slot, $d$, through each of which passes a thumb-screw, F, whereby the compass is secured to the rulers, and yet may be turned thereon, either as a whole when the rulers are closed, or each half independently when the rulers are separated. The center of the compass is cut out to expose the edges of the rulers immediately beneath, to which are secured small metal pieces $a$, which are located to determine accurately the center of the compass, which is the point from which the courses are shaped. The arcs E E' are variation-arcs, the use of which I shall presently explain. One of these may be dispensed with as far as its use in the operation is concerned, though I prefer to have it as a mechanical advantage, as it acts as a guide or stop to hold the compass to its place, and to keep it stiff and steady.

Though it may be unnecessary to explain the use of the ordinary parallel rulers in shaping courses, a brief reference to the subject, in order to illustrate the difficulty which it is the object of my invention to overcome, may be appropriate.

Having first discovered the locality of his vessel, and wishing to shape his exact course, the navigator places suitably his rulers on the chart over the spot where his vessel is, and gradually works them down to the compass at the bottom of the chart, from which, after making allowance for the variation, he determines his course. In this process or operation of working the rulers down by holding one stationary temporarily, great care must be taken to avoid the least slip, as such an occurrence will necessarily give him a mistaken course, which is liable to result unfortunately. This requisite care it is difficult to take when the motion of the vessel, the importunity of immediate duties calling elsewhere, and the agitation or excitement of the moment are all taken into consideration; and though the slip may be discovered in time, and the operation repeated several times, there is always a liability of a mistake in this respect, of which the navigator may be wholly unconscious. This difficulty I completely obviate by my invention, in the use of which the movement of the rulers down to the compass is unnecessary. Having first determined the locality of my vessel, and marked it by a dot on my chart, I then, from the chart, discover the variation, east or west, as the case may be, for that place. I then take my rulers, and loosen either one or both thumb-screws, according to whether I have the rulers separated or closed. I turn the compass, or one-half of it, as I may prefer, east or west, as the case demands, until the required number of degrees, as marked thereon, comes into line with the inner end of the variation arc or arcs, at which point I tighten it down by the screws. Then I lay my rulers down on the chart in such position that the small metal piece which marks the center of that ruler on the side of the direction in which my course lies comes directly over my position on the chart, and the rulers themselves lie perfectly parallel with the meridians or lines of longitude on the chart, which may be accurately determined by carrying the other ruler to the nearest meridian line, and making its edge coincide as near as possible with said line. Holding the rulers firmly in this position, a line projected from my position on the chart to the port desired, gives, as it passes over the compass, the proper course to be pursued to reach that port. In this there is no need to move the rulers at all, and therefore there is no liability for error from that cause.

The use of the instrument is simple, and the operation may be performed rapidly; but its use in shaping courses is not its only one, because it is adapted to take cross-bearings with equal facility. Upon sighting two lands, I take the direction which each bears from me, and, going below, I set my compass on the ruler to accord with the proper variation of the place in which my vessel is, and then lay the ruler on the chart, in the manner I have already described. I then project a line from the center, over the compass, in the direction in which the first land bore, and another from the center, over the compass, in the direction in which the second land bore. I remove the rulers, and then draw the lines back again, until they intersect, which of course is where the center of the compass was—the place of the vessel. Then with my dividers I take the distance on either line from the point of intersection to the land, and by comparison with the scale on the edge of the chart can determine my distance from either land.

Having thus described my invention, what I claim as new, and desire to secure by Letters Patent, is—

1. A nautical instrument for shaping courses and taking cross-bearings, consisting of the parallel rulers A B, connected by links C, the compass-plate D, having slot $d$, and the thumb-screw F, whereby said plate may be turned to indicate any angle of variation with the rulers, substantially as herein described.

2. A nautical instrument for shaping courses and taking cross-bearings, consisting of the parallel rulers A B, connected by links C, the compass-plate D, having slots $d$, and thumb-screws F, and the variation-arc E, substantially as herein described.

3. A nautical instrument for shaping courses and taking cross-bearings, consisting of the parallel rulers A B, connected by links C, the two-part compass-plate D, having slots $d$, and thumb-screws F, and the variation-arcs E E', substantially as herein described.

In witness whereof I have hereunto set my hand.

CHARLES HUTCHINSON.

Witnesses:
W. BENDT,
G. H. WILLIAMS.